United States Patent [19]

Clatfelter et al.

[11] 4,209,541

[45] Jun. 24, 1980

[54] PRODUCTION OF BLAND, FUNCTIONAL, DEFATTED SOY FLOUR

[75] Inventors: Kenneth Clatfelter, Moorestown; George M. LoPresti, Mt. Laurel; Joseph A. Conte, Waterford, all of N.J.; Benito O. deLumen, El Cerrito, Calif.

[73] Assignee: Campbell Soup Company, Camden, N.J.

[21] Appl. No.: 949,862

[22] Filed: Oct. 10, 1978

[51] Int. Cl.$^2$ .................................................. A23L 1/20
[52] U.S. Cl. ...................................... 426/430; 426/507; 426/518; 426/520; 426/634
[58] Field of Search ............... 426/430, 429, 436, 431, 426/518, 411, 507, 520, 634, 598

[56] References Cited

U.S. PATENT DOCUMENTS

| 2,026,676 | 1/1936 | Gill | 426/431 |
|---|---|---|---|
| 2,267,747 | 12/1941 | Plews | 426/434 |
| 2,451,659 | 10/1948 | Calvert | 260/123.5 |
| 2,524,991 | 10/1950 | Renner | 426/430 |
| 3,168,406 | 2/1965 | Moshy | 426/598 |
| 3,794,735 | 2/1974 | Newsom et al. | 426/431 X |
| 3,925,569 | 12/1975 | Daftary | 426/430 X |
| 3,941,764 | 3/1976 | Hensarling et al. | 426/430 X |
| 4,008,210 | 2/1977 | Steele et al. | 426/430 X |
| 4,079,155 | 3/1978 | Kakade | 426/431 X |

FOREIGN PATENT DOCUMENTS

| 691384 | 7/1964 | Canada | 426/431 |
|---|---|---|---|
| 52-3844 | 1/1977 | Japan | 426/590 |

OTHER PUBLICATIONS

Food Technology, vol. 21, pp. 86–89, 12/67.

*Primary Examiner*—William F. Smith
*Attorney, Agent, or Firm*—John W. Logan, Jr.

[57] ABSTRACT

The production of bland, functional, defatted soy flour in which hulled soybeans are heat treated by wet and dry heat to inactivate the enzymes, are dehulled and cracked, are thereafter defatted and washed under an inert atmosphere and then dried and milled.

10 Claims, No Drawings

PRODUCTION OF BLAND, FUNCTIONAL, DEFATTED SOY FLOUR

The present invention relates, in general, to soybean processing and, in particular, to a process for deflavoring and defatting soybean material to produce bland, functional, defatted soy flour.

The characteristic taste of soybeans includes an undesirable beany flavor which is objectionable to most people and a nutty flavor which normally is not objectionable.

Oxidation of soybean lipids catalyzed by lipoxidase is believed to be a major mechanism in the formation of the undesirable off-flavor or beany taste in soy flour. Oxygen, lipids and lipoxidase are the components of enzymatic oxidation and elimination of at least one of the three prevents the reaction which causes this undesirable flavor.

Various approaches have been taken in the past to arrest the mechanism which produces the off-flavor. For example, different "wet" processes have been suggested in which the soybean material is soaked in a liquid mixture which is specially formulated to inactivate lipoxidase or to reduce its effect. Other techniques for achieving this result involve special heat treatment of the soybean material. In yet another approach, the soybeans are subjected to infrared radiation to reduce the soy taste.

Although a number of prior efforts to prevent development of the off-flavor have met with modest success, others have been inadequate in that the beany taste was still present to an objectionable extent. Those succeeding in elimination of the off-flavor, however, have affected adversely the functional properties of the soy material, as measured by the Protein Dispersibility Index (PDI). Still another shortcoming of many of the prior proposals is that the methods and apparatus used in the processing have been complex and expensive.

Accordingly, an object of the present invention is to provide a new and improved process for deflavoring and defatting soybean material.

Another object of the present invention is to provide such a process which produces bland, functional, defatted soy flour in a simple and economical manner.

A further object of the present invention is to provide a new and improved process for deflavoring and defatting soybean material in which the PDI of the soy flour may be maintained at most any desired level.

In accordance with the present invention, soybean material is treated to inactivate lipoxidase and then dehulled and cracked to produce particles of soybean material which are defatted and coarsely pulverized or comminuted. One aspect of the invention involves carrying out the dehulling, cracking, defatting and pulverizing in an inert atmosphere. Another aspect of the invention involves inactivating the lipoxidase by first exposing the soybean material to steam and then to dry heat while at the same time protecting the soybean material from contact with oxygen.

For a better understanding of the present invention, reference is made to the following description.

The starting material is whole unhulled soybeans. The unhulled soybeans are first treated to inactivate the lipoxidase in the whole beans or reduce the lipoxidase to a low level. A fluidized bed drier and/or a conventional mechanical agitator, such as a vibrating screen, may be used for this purpose. First, steam is passed through the batch of soybeans while the beans are in an agitated fluidized bed state or are being agitated to cause rapid inactivation of lipoxidase. This is followed by passing dry hot air through the batch of soybeans to further inactivate the lipoxidase and remove moisture from the soybeans to facilitate cracking and dehulling. Again, the soybeans are agitated to obtain an even distribution of the heat. At this point, the beans are dry and the lipoxidase has been inactivated or reduced to a low level, such as to at least 10% of its original level without a significant decrease in the PDI.

The time durations for applying the steam heat and the dry hot air and the temperature of the dry hot air are process variables which are dependent upon, among other factors, the size and nature of the soybean batch, the desired PDI level of the soy flour being produced and the amount of lipoxidase initially present in the soybeans.

The initial stage of heat treatment may be with steam at atmospheric pressure for a duration of approximately thirty seconds to three minutes. The second stage of heat treatment may be with hot air at a temperature of approximately 240° F. to 300° F. The time of exposure to dry heat will be approximately four to ten minutes at 240° F., approximately one to five minutes at 270° F. and approximately thirty seconds to three minutes at 300° F.

As the initial level of lipoxidase present in the beans decreases, the heat treatment should be less severe. For example, atmospheric steaming of agitated dry whole soybeans having an initial level of lipoxidase at 920 TU/gm for one minute produced a product having 45% deactivation of the lipoxidase and a PDI of 70%. The same treatment of agitated soybeans having an initial level of lipoxidase of 170 TU/gm produced a product having 99% deactivation of the lipoxidase and a PDI of 87%. Without agitation soybeans having an initial level of lipoxidase of 170 TU/gm treated with atmospheric steaming for one minute had a 25% of inactivation of lipoxidase and a PDI of 65%. Similarly, treatment of agitated dry whole soybeans with hot air at a velocity of 750 feet per minute passing through the beans for five minutes at 240° F. produced the following results with different initial levels of lipoxidase.

| Initial Level of Lipoxidase TU/gm | Percent Inactivation | PDI |
| --- | --- | --- |
| 920 | 74 | 66 |
| 712 | 82 | 76 |
| 170 | 100 | 77 |

The combination of the two stage heating with steam first and dry heat last is important in that the beans are heat treated in an unhulled state to keep oxygen away from the soybean material and it is desirable to have the beans dry for the later cracking and dehulling operation. However, the steam treatment produces greater and more rapid deactivation of the lipoxidase with less decrease in PDI than does comparable dry heat. Ideally, the two stages should be selected so that in the initial stage the lipoxidase level is reduced by 80% and in the final stage there is a further 80% or more reduction in the lipoxidase level. The required temperature and time relationship to accomplish this for various initial levels of lipoxidase can readily be determined experimentally.

The dry soybeans, with the lipoxidase inactivated, next are cracked and dehulled. Cracking may be carried out in equipment of conventional construction and operation. To prevent or minimize both enzymatic and chemical oxidation which would result from exposure of the soybeans to air, it is preferable to provide an inert atmosphere blanket during cracking and dehulling. With suitable modifications being made to the cracking and dehulling apparatus, carbon dioxide or nitrogen, for example, may be introduced to develop the desired inert atmosphere.

The cracked and dehulled soybean particles then are defatted and coarsely pulverized or comminuted. This operation also is carried out in an inert atmosphere to prevent or minimize enzymatic and chemical oxidation. In particular, the cracked and dehulled soybean particles are deposited for defatting and pulverizing in suitable blending apparatus, and a first quantity of solvent is added to the soybean particles. Carbon dioxide or nitrogen is introduced into the blending apparatus to provide an inert atmosphere as the mixture of soybean particles and solvent is blended.

The solvent used for the fat extraction is preferably hexane, but pentane or ethylene chloride may also be used. The solvent to soybean ratio is approximately three parts solvent to one part soybeans by weight. This mixture is blended for a period of several minutes during which the operation of the blender will also pulverize the soybean material while the fat is extracted. The defatting procedure is repeated three to four times, extracting the solvent from the slurry and replacing the solvent at each repeat of the process.

Thereafter, the soybean material is washed in the same type of blender as used in the extraction process. Washing is accomplished with a solvent-alcohol mixture in the ratio of approximately four parts solvent to one part alcohol. The solvent may be the same as used in the defatting procedure while the alcohol may be ethanol. The solvent-alcohol mixture is used in the ratio of approximately three parts mixture to one part soybean material by weight to form a slurry. The slurry is placed in the blender and mixed for a period of several minutes while under an inert atmosphere. This washing process should be repeated three to four times, replacing the solvent-alcohol mixture at each repeat of the process. During washing, the polar lipids are removed from the soybean material, the lipoxidase is further inactivated and endogenous and/or formed off-flavors are removed.

As an alternative, the soybean material may be formed into flakes subsequent to the cracking and dehulling step. Thereafter the flaked soybean material may be subjected to the extraction and washing steps.

After washing the soybean material is dried and desolventized by placing the material under vacuum to remove all traces of solvent and alcohol. Thereafter, the soybean material is ground or milled to form soy flour.

The soy flour produced by the process is characterized by a very slight off-white color, a high PDI and no soy odor or taste. It also has improved water holding capacity over presently available commercial soy flours. Tests of storage stability measured by head-space analysis of volatiles over extended periods of time show that the soy flour produced by this process emits substantially less volatiles than present commercially available soy flours thereby indicating greater stability and much less tendency to produce soy flavor or odor after extended storage. The PDI of this flour can be maintained at a high level and preselected PDI can be obtained by careful pretesting of the soybean material and control of the heating stages within the range previously described.

We claim:

1. A process for producing bland, functional, defatted soy flour comprising:

inactivating the lipoxidase by heating a batch of hulled soybean material to substantially or completely inactivate lipoxidase, said heating including first passing steam through said batch of soybean material and then passing dry hot air through said batch of soybean material while substantially continuously agitating the soybean material;

dehulling and cracking said heated soybean material to produce particles of soybean material;

defatting said particles of soybean material in an inert atmosphere;

washing the defatted soybean material in an inert atmosphere to remove polar lipids; and drying and milling the defatted and washed particles of soybean material to produce defatted soy flour.

2. The process of claim 1 wherein said defatting includes:

adding a first quantity of solvent to said soybean particles and blending the mixture of soybean particles and solvent under an inert atmosphere to produce a slurry;

extracting said solvent from said slurry to draw off fat from said soybean material; and repeating, a predetermined number of times, said adding of a first quantity of solvent, blending of said mixture and extraction of said solvent from said slurry.

3. The process of claim 2 in which the solvent is selected from the class containing hexane, pentane and ethylene chloride.

4. The process of claim 3 wherein solvent is added to said soybean particles in the ratio of approximately three parts by weight solvent to one part by weight soybean material.

5. The process of claim 1 wherein said washing of the defatted soybean material includes:

adding a first quantity of solvent-alcohol mixture to said soybean particles;

blending the solvent-alcohol mixture and soybean particles under an inert atmosphere to form a slurry;

extracting the solvent-alcohol mixture from the soybean particles; and repeating, a predetermined number of times said adding, blending and extraction of solvent-alcohol mixture and soybean particles.

6. The process of claim 5 wherein said solvent-alcohol mixture comprises approximately four parts by volume of solvent selected from the class containing hexane, pentane and ethylene chloride to one part by volume of ethanol.

7. The process of claim 6 wherein the solvent-alcohol mixture is added to soybean particles in the ratio of approximately three parts by weight of solvent-alcohol mixture to one part by weight of soybean particles.

8. The process of claim 1 wherein steam at atmospheric pressure is blown through said batch of soybeans for approximately thirty seconds to approximately three minutes and dry hot air at a temperature of approximately 240° F. to 300° F. is thereafter blown through said batch of soybeans.

9. The process of claim 8 wherein said hot air is blown through the soybeans for a period of time ranging from approximately four to ten minutes at the low range of said temperature to approximately thirty seconds to three minutes at the high range of said temperature and approximately one minute to five minutes at the middle range of said temperature.

10. The process of claim 9 including the step of inactivating the lipoxidase in the soybeans by approximately 80% by the application of steam heat and subsequently further inactivating the lipoxidase approximately 80% or more from the level of lipoxidase remaining at termination of steam heat by the application of hot air.

* * * * *